United States Patent [19]

Sorbier

[11] 4,435,347

[45] Mar. 6, 1984

[54] PROCESS FOR THE PRODUCTION OF MOLDED MEMBERS FROM ELONGATED PARTICLES OF WOOD

[75] Inventor: Pierre Sorbier, Pernes-les-Fontaines, France

[73] Assignee: Agence Nationale de Valorisation de la Recherche (ANVAR), Neuilly-sur-Seine, France

[21] Appl. No.: 274,267

[22] Filed: Jun. 16, 1981

Related U.S. Application Data

[63] Continuation of Ser. No. 52,266, Jun. 26, 1979, abandoned.

[51] Int. Cl.[3] .................................... B29J 5/00

[52] U.S. Cl. .................................... 264/118; 264/119; 264/120

[58] Field of Search .................... 264/118, 119, 120

[56] References Cited

U.S. PATENT DOCUMENTS 2,618,813 11/1952 Patton et al. .................... 264/120

2,719,328 10/1955 Patton et al. .................... 264/120

3,354,248 11/1967 Haas et al. .................... 264/119

3,809,736 5/1974 Munk .................... 264/120

FOREIGN PATENT DOCUMENTS 1573928 6/1969 France .

*Primary Examiner*—James R. Hall

*Attorney, Agent, or Firm*—Brisebois & Kruger

[57] ABSTRACT

A method for forming articles such as crates in which sides of the crate extend generally perpendicular to the base of the crate. The method includes forming a layer of loose binder coated wood particles, precompressing selected portions of the layer which form the sides of the crate, bending the precompressed portions upwardly, inserting the so formed layer in a mould and compressing the layer in the mould to form the desired article. The initial layer can be slightly compressed to hold the particles together and the base of the article can also be slightly precompressed but to a lesser extent than the portions which form the sides.

10 Claims, 10 Drawing Figures

Fig. 6A
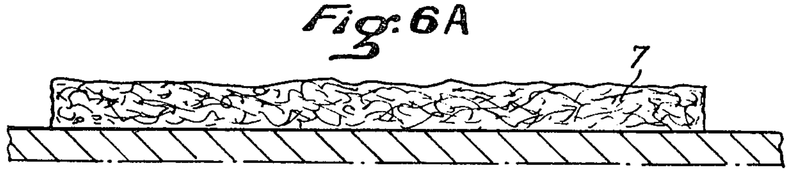
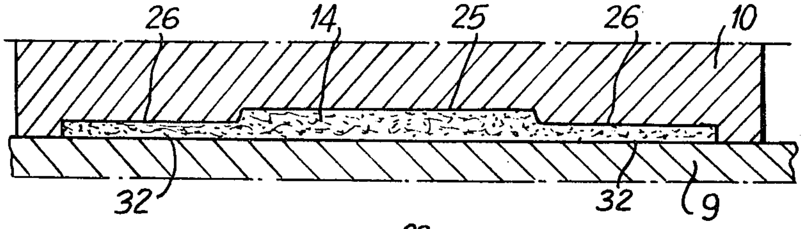
Fig. 6B
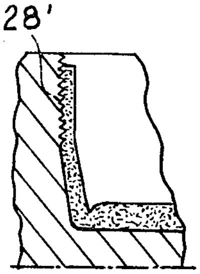
Fig. 6C'
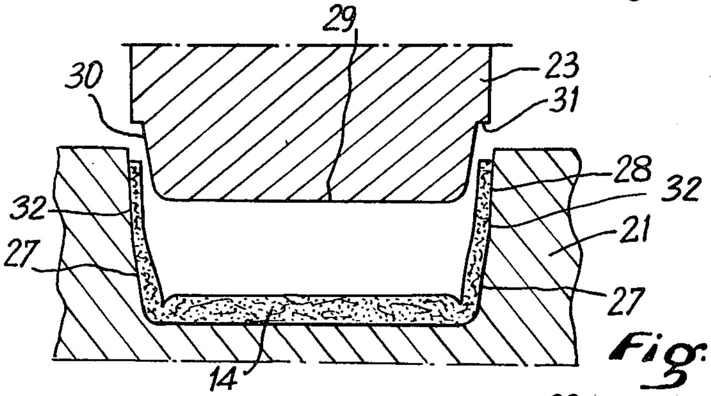
Fig. 6C
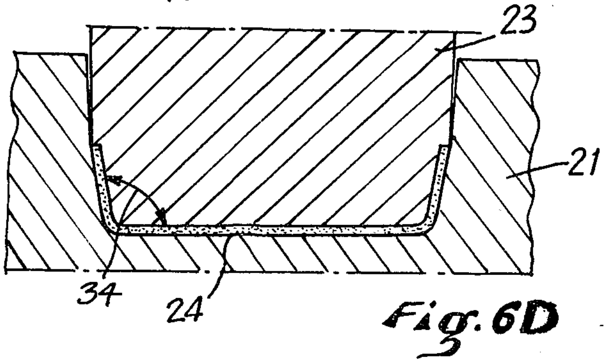
Fig. 6D
Fig. 7
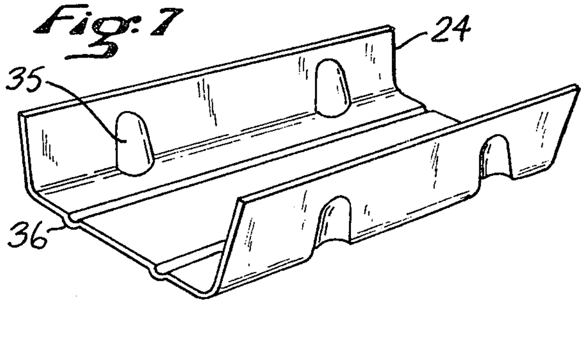

PROCESS FOR THE PRODUCTION OF MOLDED MEMBERS FROM ELONGATED PARTICLES OF WOOD

This is a continuation of application Ser. No. 52,266, filed June 26, 1979 now abandoned.

The present invention relates to a process for the production of articles from elongated particles of comminuted wood.

The process is applicable more particularly to the production of one piece articles having a base and at least one side wall as an extension of the base at an angle of approximately 90°. Thus, the process makes it possible to manufacture e.g. cases, boxes and crates, as well as other articles made from comminuted wood particles.

Similar wood particle materials are at present manufactured by various methods, using wood shavings or sawdust and require a relatively large quantity of polymer resin binder for polymerization purposes without leading to completely satisfactory results.

Other processes use elongated wood particles or elongated wood fibres, as described in French Pat. No. 1 573 928, Addition No. 95 386 and French Pat. No. 75 36492. These fibres have considerable length compared with their cross-section and also have cross-sectional unevennesses either within the same fibre or between different fibres.

These known particles can be mixed with a minimum quantity of resin, and lead to making articles with a relatively complicated shape and having exceptional mechanical characteristics.

In general, the compression of such wood particles is carried out in a mold. When it is desired to produce a hollow article, for example in the form of a crate or case, in the mold is placed a layer of wood particles all of which have optionally undergone a precompression after which various plungers from different directions compress the layer to give it a final shape. The layer is thereafter polymerized.

Although such a process is satisfactory with regard to the quality of the article obtained it requires relatively heavy and complex equipment, which increases the price of the products obtained.

The object of the subject invention is to provide a process permitting the manufacture of one piece articles from elongated fibres or particles of comminuted wood having a base and at least one side wall extending at an angle with respect to the base. The process is performed in a practical manner using relatively simple and smaller equipment, particularly presses, making it possible to increase the manufacturing output rate.

The invention relates to a process for the production of one piece articles made from comminuted wood particles comprising a base and at least one side wall extending at an angle to the base. A layer of binder-coated particles is precompressed in a platen press, and is then finally compressed in a mold, wherein the precompression is applied to the portion of the layer which is to form the side wall so as to obtain a precompressed layer, having a portion to form the base with a thickness which is significantly greater than the thickness of the portion forming the side walls.

During the precompression step the portion forming the base is compressed significantly less than the portion to form the side walls.

The angle between the base and side wall is an angle which can be as great as 86°, but is preferably between 80° and 83°, or much less.

When the compression ratio, i.e. the thickness of the initial uncompressed layer to the final thickness of the finished article is 25:1 to 40:1, the precompression ratio, i.e. the ratio of the thickness of the initial uncompressed layer to the thickness of the precompressed layer is preferably between 10:1 and 18:1.

To make a U-shaped cross-section with a base and two sides forming an angle relatively close to the perpendicular with the base, there is an initial precompression of the portions of the layer which are to form the two sides, so that the thickness of these portions is 2 to 3 times greater than that of the sides of the finished article and preferably also a precompression of the portion forming the base to a thickness between 10 to 15 times the thickness of the finished article base.

The precompressed layer is then fed into a mold having a substantially U-shaped female part and a corresponding male part able to penetrate the female part.

During the closing of the mold the portions which are to form the side walls are bent and are then compressed between corresponding base surfaces of the parts of the mold.

It has surprisingly been found that when the side walls form an angle close to 80°, for example 83°, the press operating the mold requires a high molding force during only the final phase, for example a pressure of 100 to 120 $Kg/cm^2$ on the base. Once the parts of the mold are brought together by the necessary distance corresponding to this high pressure, the pressure can be reduced to a much lower value, for example 70 to 80 $Kg/cm^2$ while the article remains compressed in the initial state corresponding to the high compression, this probably being due to the low back pressure of the material.

Polymerization is carried out in the mold for extremely short periods of 10 to 20 seconds. After polymerization the two parts of the mold are separated and the article is ejected. In the case of U-shaped articles ejection can take place just before a new precompressed layer is introduced.

The process has the advantage of requiring only a very limited travel under high pressure if the precaution has been taken to sufficiently compress the base during the precompression stage of the sides or walls.

In producing an article having a shape other than a U-shape configuration, as for example, a crate with four or more walls, it is possible to provide a layer having cutouts at the corners of the layer between two adjacent side wall portions.

After precompression, the layer in inserted in the compression mold, the side walls are bent upwardly and the corresponding edges of two adjacent sides are positioned in the vicinity of one another to form a corner. The continuation of the lowering of the movable part of the mold causes, due to displacement of the connecting material between the two sides, a connection after polymerization.

Thus, it is possible to produce crates having a bottom and several side walls, for example, four, substantially perpendicular to the bottom. This operation is performed in one molding operation using a simple two-part mold.

The process also makes it possible to mold into the side walls, and if desired also into the bottom, ribs or grooves or other configurations.

The female part of the mold has, facing the side wall to be compressed, a wall which extends from the base at an angle, this wall being surmounted by a second, preferably vertical or almost vertical portion having a roughened surface, for example corrugations.

At the start of the compression step the roughened portion prevents the downward slipping of the material forming the side wall under the action of the penetration of the male mold member part of the mold thus assisting the compressing of the side wall. During the descent of the male part, the side wall decreases in thickness and also in height until it leaves the roughened portion and is finally compressed against the female mold wall below the roughened portion.

According to a special embodiment the apparatus can advantageously have, in front of the precompression station, a station which is able to slightly compress the expanded layer of binder-coated particles in order to give a certain cohesion to the layer to premit easier conveying. This can be done, for example, by passing the expanded layer between two slightly convergent endless belts. At the layer exit point it is advantageously possible to provide cutting or trimming means permitting the formation of layer sections which are then transferred to the precompression station.

The precompression station has a platen press on which is placed a layer section and an appropriately shaped plate permitting compression of one or more lateral portions of the section which are to form the side walls while the central portion is only slightly compressed or not compressed.

The precompression station supplies a row of compression or molding stations by means of corresponding transfer means. It is therefore possible to provide two rows of three compression stations each comprising a two-part mold, whereby the transfer means can alternately feed the portions to the different molds.

The transfer means can comprise elements which can be turned up in such a way as to bend the side wall portions of a precompressed layer with respect to the bottom portion in order to bring about an easier introduction into the mold. In the case when U-shaped parts are produced, where there is no variation in the length, it is possible to provide molds having two open ends and to enable the layer, with its turned-up sides to enter by one of the ends into the mold, while the portion which has been compressed in the mold is simultaneously discharged from the other end.

Other advantages and features of the invention can be gathered from reading the following description of a non-limitative embodiment of the method and apparatus of the invention, with reference to the attached drawings.

BRIEF DESCRIPTION OF DRAWINGS

FIGS. 6A–6D diagrammatically show cross-sectional views of different stages of the process according to the invention; and FIG. 7 is a pictorial view of a finished U-shaped member of the invention.

The apparatus according to the invention has means for the production, transfer and impregnation of particles constituted by wood fibres separated in the direction of the length of the fibres in accordance with French Pat. No. 75 36492.

The wood fibres constituting the particles described in the present embodiment are fibres corresponding to the above-mentioned French patent and whose lengths are on average 70 mm, but with larger or smaller individual lengths, and cross-sections of approximately 0.6 $mm^2$. These fibres obtained by fibre separation of wood logs in the lengthwise direction.

Figure 4:
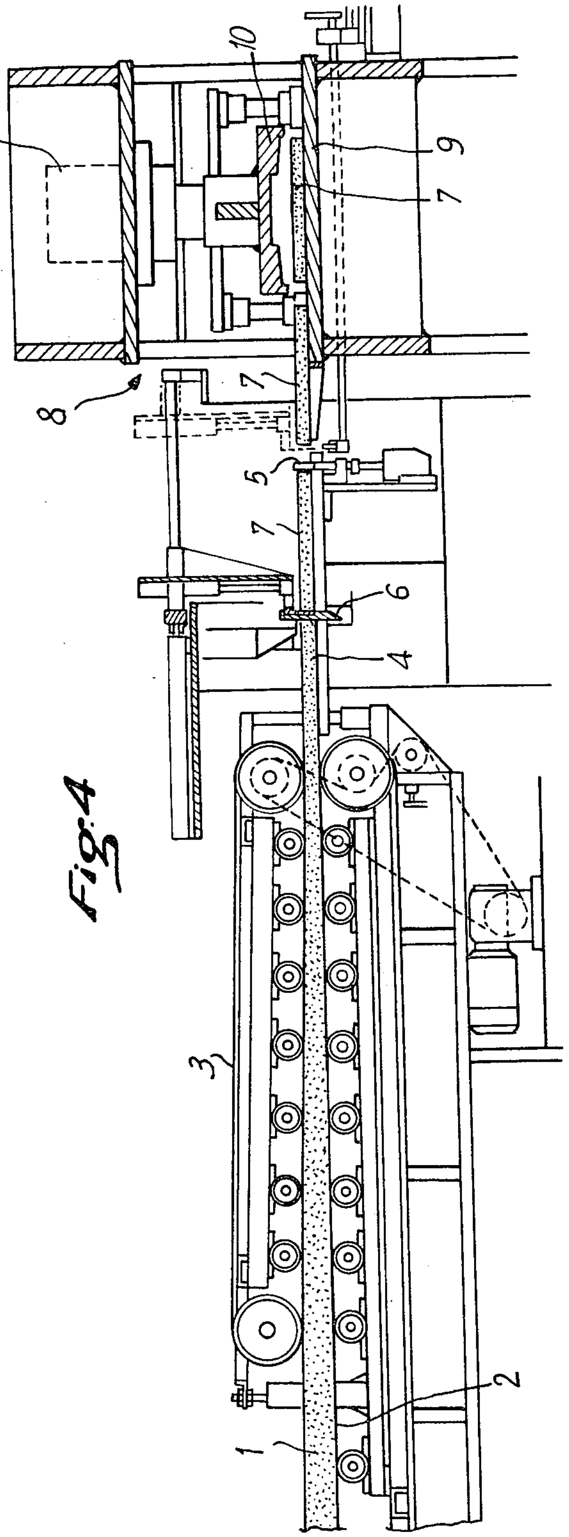
FIG. 4 is a view in elevation of a precompression apparatus according to the invention.
Figure 3:
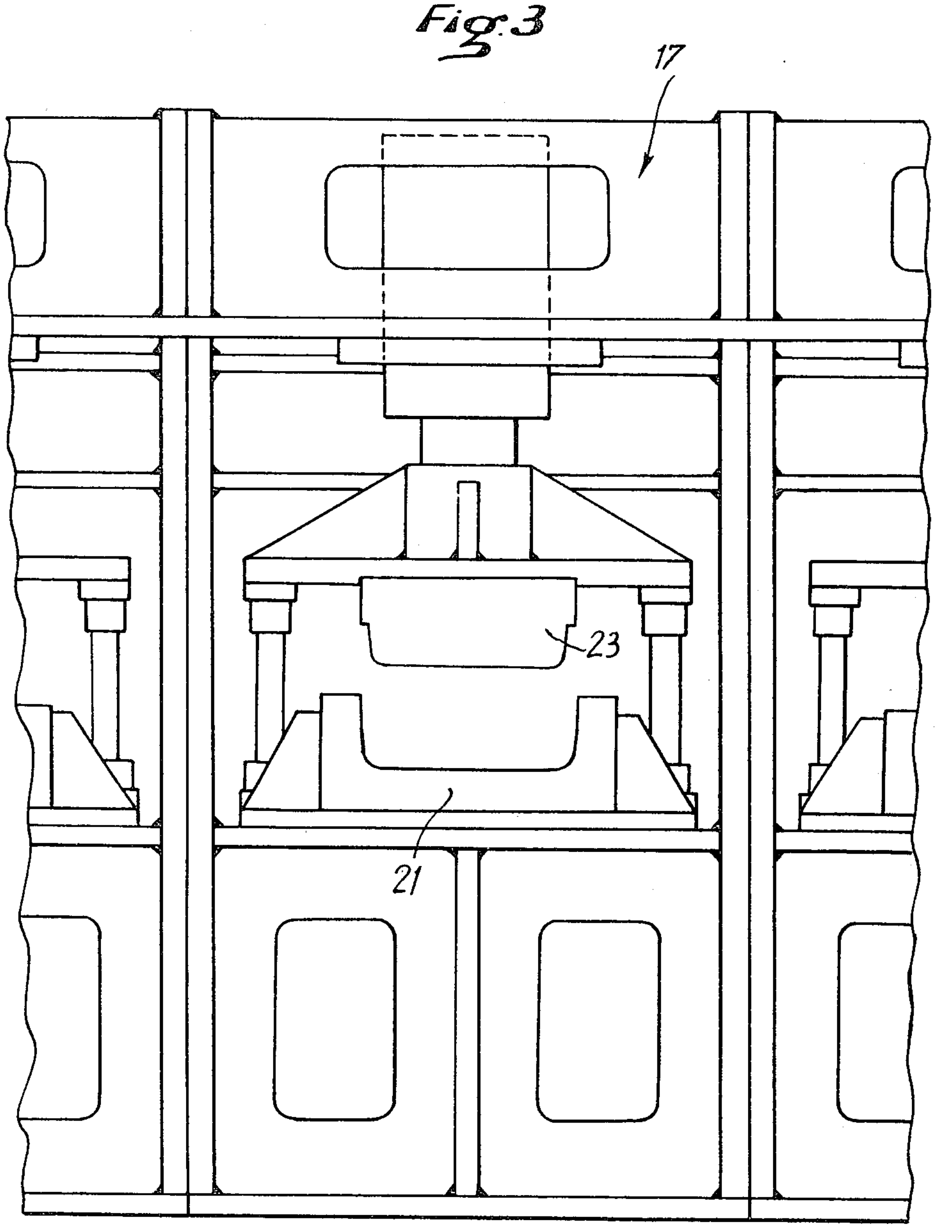
FIG. 3 is an end view of an array of presses of the apparatus.

The fibres which have been impregnated with a small percentage of binder, for example 8%, according to the above-mentioned French patent, and in the form of a continuous expanded layer 1 (FIG. 4) are carried by a lower conveyor belt 2 to a calandering station comprising an upper endless belt 3 which progressively moves towards the lower belt 2 in order to progressively bring about a slight compression of the layer of fibres.

The layer of fibres is discharged in a somewhat compacted state 4 to a cutting device, which has a retractable stop member 5 which is able to temporarily immobilize the layer of fibres while the conveyors slip, and a vertically movable knife 6 which operates with a (not shown) counter-knife is able to cut the layer into layer sections 7. These layer sections 7 are then conveyed in an accelerated manner to a precompression device 8.

As a variant it is advantageously possible to use, for cutting the layer of fibres in state 4, a saw (not shown), for example, a circular saw carried by a carriage moving with the layer and at the same speed as the latter during the sawing operation, and then returning to its initial position after sawing.

The precompression device 8 has a lower table 9 on which rests an individual layer section 7 and a plate 10 which can be brought towards the table 9 by two jacks 11 which can exert a compression force of 120 to 200 $Kg/cm^2$ on the layer section 7.

Before precompression in device 8, the layer section 7 has a thickness of e.g. 30 to 50 mm, while the initial thickness of the layer before passing between belts 2 and 3 is approximately 100 to 120 mm. After precompression the precompressed sides 32 have, after an elastic return, a thickness of approximately 6 to 7 mm in the case of a desired end product thickness of about 3 mm.

When the layer portion has been precompressed at this precompression station it is transferred by an appropriate transfer means 12 (FIGS. 1 and 2) to a system comprising two parallel groups of three presses 17. The groups of presses 17 are supplied by appropriate transfer means 13 which move laterally and which are able to feed the precompressed layer sections 14 to the different individual presses 17.

Transfer means 13 can be belts moving laterally with respect to the exit point of the precompression station 8 and convey the now compressed layer sections 14 supplied by transfer means 12.

Figure 1:
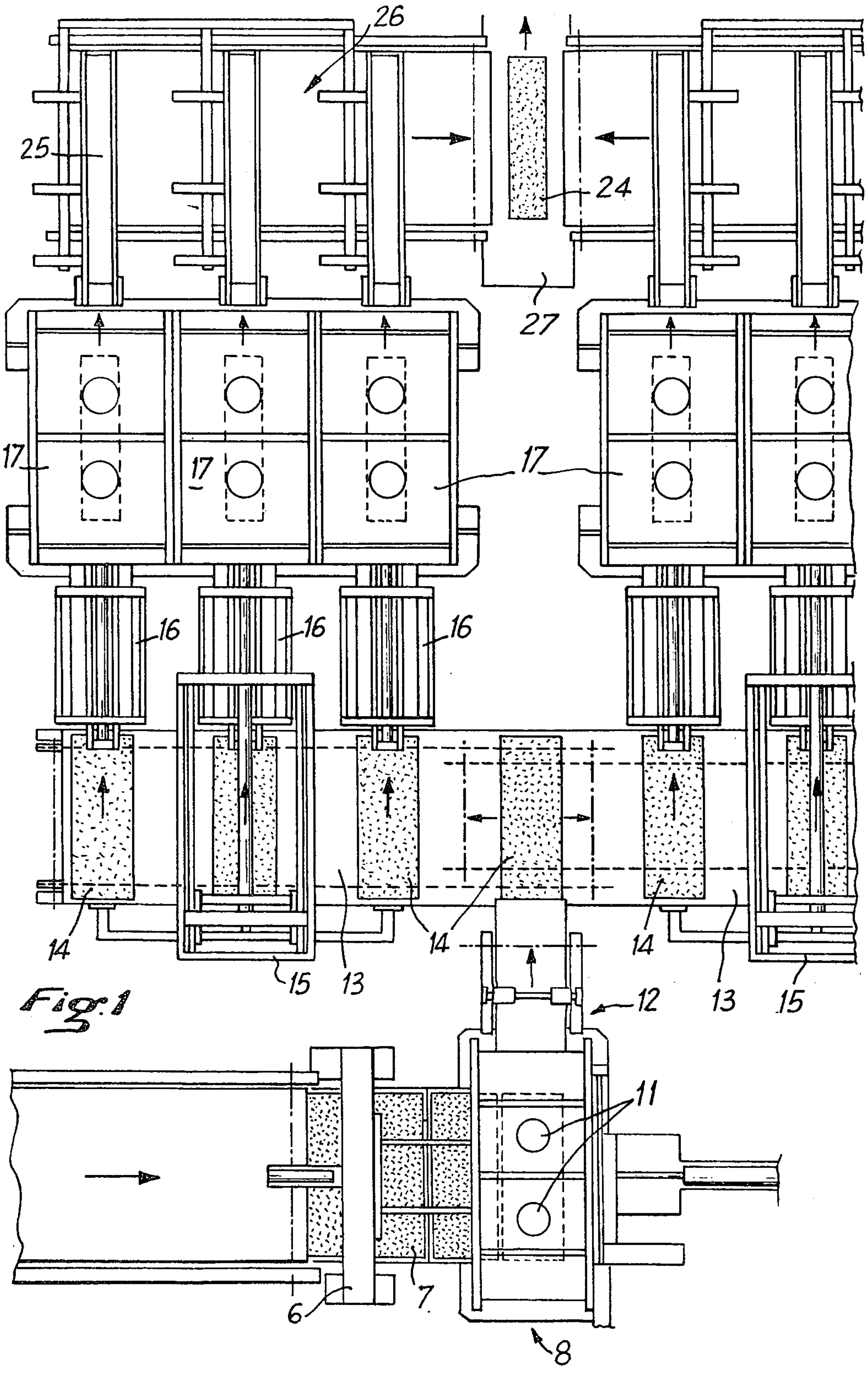
FIG. 1 is a plan view of an apparatus according to the invention.
Figure 2:
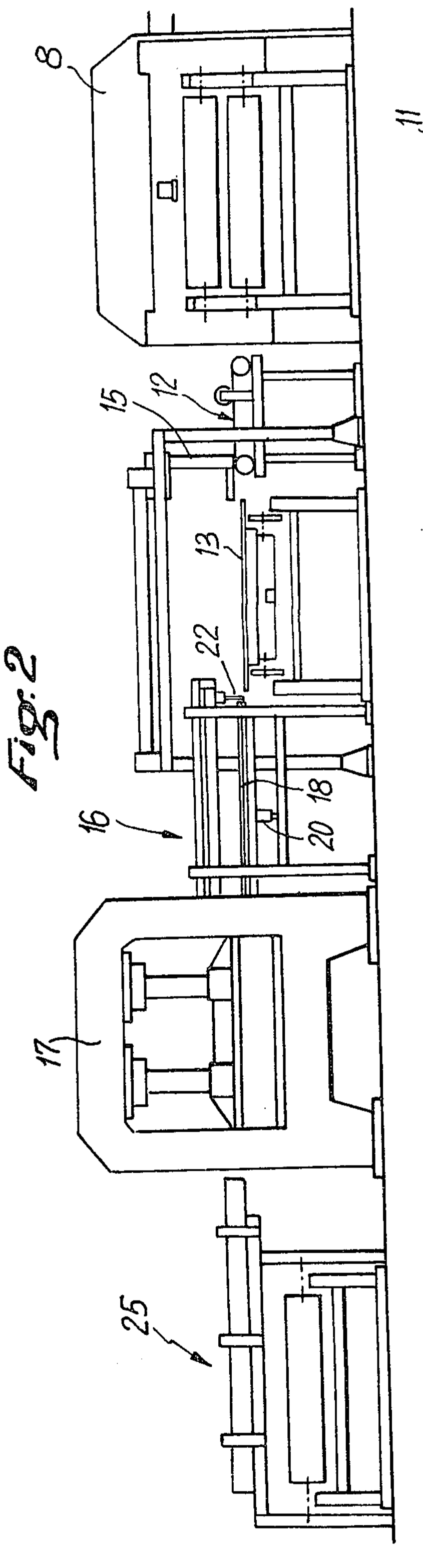
FIG. 2 is a left hand side view of the apparatus of FIG. 1.

FIG. 1 shows several precompressed layer sections 14 on transfer means 13. Above the transfer means 13 there are handling means 15 which are able to individually move a section 14 in a direction perpendicular to the direction of displacement of conveyor belts 13.

Transfer means 15 makes it possible to push the sections towards feed or supply means 16 for the different individual presses where compression and polymerization take place. Due to the existence of six compression and polymerization stations i.e. molding stations, in the form of presses 17, the total time taken for the supply, compression and polymerization can be about six times greater than the precompression time at station 8.

Figure 5:
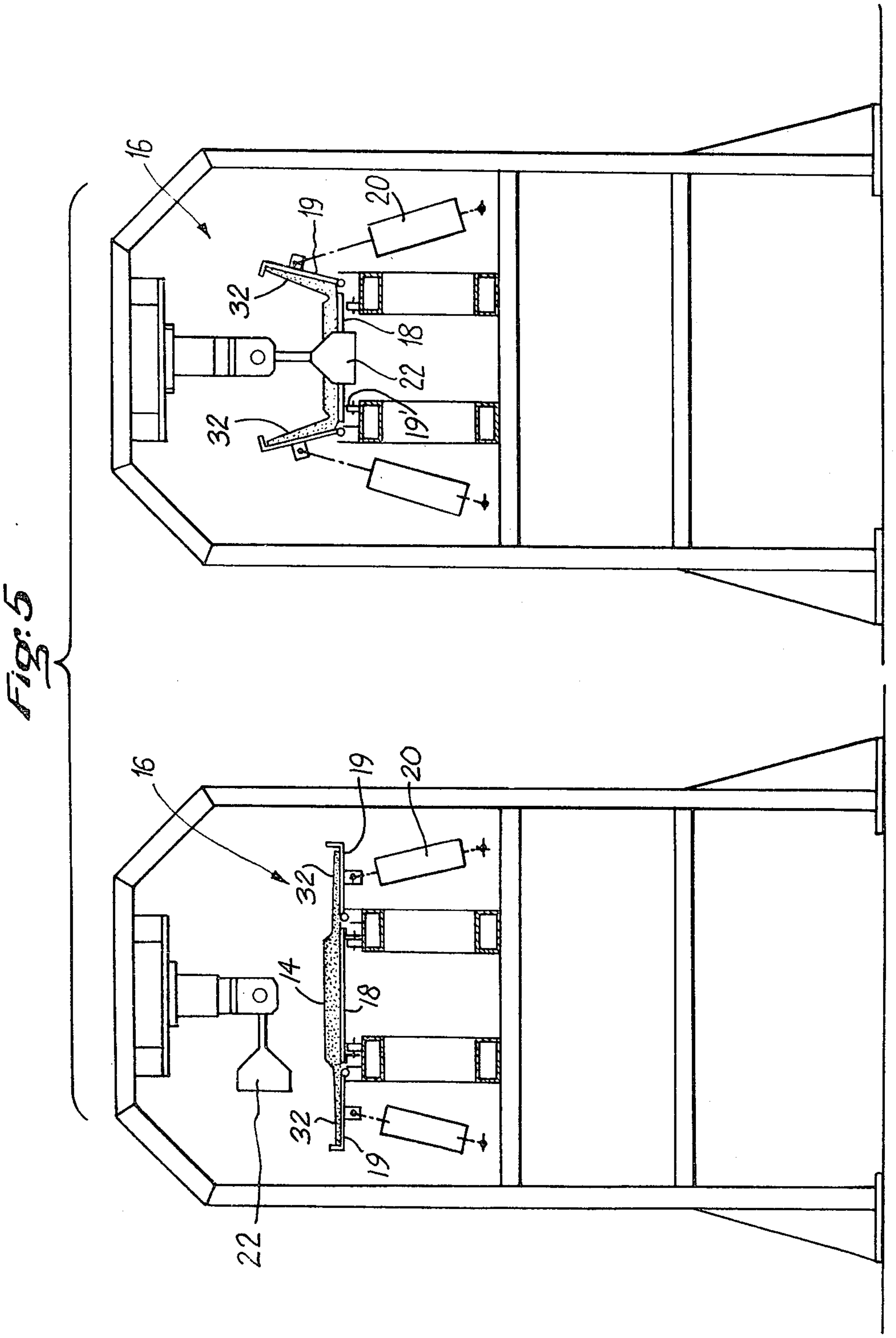
FIG. 5 is a section view of a device for supplying the mold.

The different presses 17 at the molding stations are automatically supplied by feed means 16 which, as is apparent from FIG. 5 comprise a plate 18 with two side boards 19 which can be turned-up by jacks 20. The plates 18, which are relatively thin, roll on rollers 19' and can introduce the layer section 14, whose sides 32 have been turned-up, into the female mold 21. Plate 18 is withdrawn rearwards when the layer section 14 is in the mold. The movement can be transmitted by a movable retractable arm 22.

When a precompressed section 14 with folded-up sides 32 has been introduced into the female mold 21 and plate 18 has been moved out of the mold the upper male mold 23 is moved towards the female mold and, towards the end of the stroke a compression pressure of 100 to 120 $Kg/cm^2$ is developed. When the end of the stroke is reached the pressure is reduced to about 70 to 80 $Kg/cm^2$. This reduced pressure level is maintained during simultaneous polymerization caused by heating the mold. The total duration of the cycle can be less than 20 seconds.

At the end of the compression and polymerization operation the male mold 23 is again moved upwards and the molded article 24 (FIG. 7) is ejected rearwardly from the mold toward belts 25, in a direction opposite to the entering direction of the layer section 14. The molded article 24 is then taken up by longitudinal removal means, such as belts 25, (FIGS. 1 and 2 which move the article 24 to lateral transfer means 26 (FIG. 1), which in turn move the article onto a central discharge belt 27.

The different individual operations performed on the material will now be described in greater detail with particular reference to FIGS. 6A–6D.

In FIG. 6A there is shown a cut layer section 7, which has been given a very slight precompression to give it hold. Layer section 7 is then brought onto table 9 (FIG. 6B) where it is compressed by downward movement of plate 10. It can be seen that the central cavity 25 in plate 10 which corresponds to the portion which is to form the base in precompressed layer section 14 is much deeper than the cavity at side parts 26. The side parts 26 of the plate 10 thus give the sides 32 of layer section 14 a much greater compression than the central part of the layer section.

After bending up the sides 32 of layer portion 14 as previously described with reference to FIG. 5, it is introduced into the female mold 21 (FIG. 6C). This female mold has a generally U-shaped cross-section with a flat base and two lower side wall portions 27 whose faces are preferably inclined at an angle 34 of 83° relative to the horizontal. The height of the faces of wall portions 27 substantially corresponds to the height of the finished article 24. Above the lower side wall portion 27 there is a female wall portion 28 which is vertical or very close to vertical to facilitate entry of the male mold 23. Wall portion 28 preferably has a height which is greater than the height of lower wall portion 27. Advantageously wall portion 28 has, as shown in FIG. 6C' a rough surface 28', for example produced by corrugating, milling or in any other way.

Prior to the lowering of the male mold 23, the turned-up sides 32 extend onto the upper wall portions 28 of the female mold 21, and when the male mold 23 is lowered the roughness of surface 28' of the upper wall portions 28 brakes the downward movement of the upper part of side 32 of the layer section in such a way that during the descent of mold 23, the mold progressively compresses the sides 32 while decreasing both their thickness and length.

Male mold 23 has a lower surface 29 for molding the bottom, and sides 30 have substantially the same inclination as wall portions 27 of the female mold. A step defines a flat shoulder 31, whose function is to move the upper edges of the sides 32 of the layer section 14 downwardly and to seal the mold. The finally assumed shape is shown at FIG. 6D.

When the mold is in the completely sealed position shown at FIG. 6D experience has shown that it is only necessary to maintain a relatively low pressure to retain the compression state which was reached under high pressure during the downward movement, probably due to the wedging effect between the mould walls and the material.

Referring now to FIG. 7 there is shown the U-shaped article molded according to the invention and having ribs 35, 36, respectively in its sides and bottom The ribs in the sides are preferably made in vertical planes and those of the bottom can be in a random direction.

When ribs 35 such as those shown in FIG. 7 are formed in the sidewalls of the molded article it is obvious that it is merely necessary to appropriately shape the male and female parts of the mold to obtain these ribs by merely moving the mold parts together.

However, if it is desired to provide in the sidewalls corrugations or ribs extending parallel to base 36 it is then necessary to provide corresponding slide blocks in the male and female molds. Thus, for example, it is possible to provide in the male mold slide blocks which are normally retracted and able to move horizontally. Initially the ends of the slide blocks are flush with the side wall 30 of the male mold and they locally ensure the continuity thereof. During the lowering of the male mold 23 the slide blocks are pushed outwards by a suitable mechanism at the time when the male mold reaches the end of its downward travel and force the already compressed material encountered towards the corresponding face of the female mold. This corresponding face also has complementary slide blocks kept flush, for example, with the lower wall portion 27 by springs, and are horizontally forced back with respect to the surface of wall portion 27, by the slide blocks of the male mold.

To extract the molded article it is then necessary to bring the slide blocks of the male mold into the interior thereof prior to raising it.

Thus, the invention permits in a surprising manner the economic manufacture of articles as a result of compression in one direction only, from elongated particles which provide excellent mechanical properties, but which are difficult to handle.

What we claim is:

1. A process for producing, from binder-coated wood particles, a one piece molded article having a base, and at least one side wall as a continuation of said base, but extending at an angle relative to said base, comprising:

forming a layer of binder coated wood particles into a generally flat section, having a first portion to be the base of said article, and at least one other portion to be at least one side wall of said article, precompressing said side wall portion to a thickness less than the thickness of said base portion, then bending said side wall portion at the junction of said base portion and said side wall portion of said section to form an angle with said base portion, placing the bent section into a mold, compressing and heating said bent section in said mold to mold said section, and to bond said coated wood particles to form said molded article, and opening said mold, and removed said molded article.

2. The process of claim 1, wherein said bonding of the coated wood particles results from said heating and polymerizing of said bonder.

3. The process of claim 1 wherein said angle between said base and said side wall is 80° to 86°.

4. The process of claim 3 wherein said angle between the base and said side wall is 80° to 83°.

5. The process of claim 1 wherein the force applied during the compressing of the bent section in the mold is substantially perpendicular to said base portion.

6. The process of claim 1 wherein said mold has a depth greater than the height of said molded article.

7. A process according to claim 1 further comprising precompressing the base portion of said flat section, prior to bending, to a thickness greater than the thickness of the precompressed side wall portion.

8. A process according to claim 1 wherein said step of forming said generally flat section comprises continuously forming a layer of binder coated wood particles, and cutting the layer into said flat sections.

9. A process according to claim 8 wherein said step of forming said flat sections further comprises compacting said layer prior to cutting to form said sections.

10. A process for producing, from binder-coated wood particles, one piece molded articles, each having a substantially flat base, and at least one substantially flat side wall as a continuation of said base, but extending at an angle relative to said base, comprising:

(a) forming a continuous layer of uniform thickness, (b) compressing said layer to a reduced thickness, (c) cutting said compressed layer into sections, each having a first portion to be the base of said article, and at least one other portion to be at least one side wall of said article, (d) precompressing said side wall portion to a thickness less than said base portion thickness, (e) bending, at the junction of said base portion and said side wall portion, to form a bent section with the side wall portion at an angle to said base portion, (f) placing said bent section into a mold, having a male portion and a female portion, (g) compressing and heating in said mold said bent section to mold said section, and to bond said coated wood particles into said molded article, and (h) opening said mold, and removing said molded article.

* * * * *

UNITED STATES PATENT AND TRADEMARK OFFICE

CERTIFICATE OF CORRECTION

PATENT NO. : 4,435,347

DATED : March 6, 1984

INVENTOR(S) : Pierre SORBIER

It is certified that error appears in the above—identified patent and that said Letters Patent is hereby corrected as shown below:

In the heading insert:

-- [30] Foreign Application Priority Data

July 5, 1978 [FR] France......78.19980 --.

Signed and Sealed this

*Twenty-ninth* Day of *May 1984*

[SEAL]

*Attest:*

GERALD J. MOSSINGHOFF

*Attesting Officer* *Commissioner of Patents and Trademarks*